(12) United States Patent
Ma

(10) Patent No.: US 11,131,109 B2
(45) Date of Patent: Sep. 28, 2021

(54) ENCLOSURE HAVING OUTER SURFACE WITH VORTEX-INDUCED VIBRATION SUPPRESSION FUNCTION

(71) Applicant: BEIJING GOLDWIND SCIENCE & CREATION WINDPOWER EQUIPMENT CO., LTD., Beijing (CN)

(72) Inventor: Shengjun Ma, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 476 days.

(21) Appl. No.: 16/306,539

(22) PCT Filed: Apr. 24, 2018

(86) PCT No.: PCT/CN2018/084197
§ 371 (c)(1),
(2) Date: Nov. 30, 2018

(87) PCT Pub. No.: WO2019/047537
PCT Pub. Date: Mar. 14, 2019

(65) Prior Publication Data
US 2021/0222451 A1 Jul. 22, 2021

(30) Foreign Application Priority Data
Sep. 11, 2017 (CN) .......................... 201710812913.7

(51) Int. Cl.
*E04H 12/00* (2006.01)
*E04B 1/98* (2006.01)
(Continued)

(52) U.S. Cl.
CPC ............... *E04H 12/00* (2013.01); *E04B 1/98* (2013.01); *F03D 80/00* (2016.05); *F15D 1/14* (2013.01);
(Continued)

(58) Field of Classification Search
CPC ........ F03D 7/0296; F03D 80/00; F03D 13/40; F05B 2240/122; F05B 2260/96;
(Continued)

(56) References Cited

U.S. PATENT DOCUMENTS 3,581,449 A * 6/1971 Huber ..................... E04H 12/00
52/84
6,908,063 B2 * 6/2005 Bearman ................... F15D 1/12
244/130
(Continued)

FOREIGN PATENT DOCUMENTS

CN 102226379 A 10/2011
CN 202023701 U 11/2011
(Continued)

OTHER PUBLICATIONS

International Search Report and Written Opinion in corresponding PCT Application No. PCT/CN2018/084197, dated Jun. 28, 2018, 8 pages.
(Continued)

*Primary Examiner* — Brent W Herring
(74) *Attorney, Agent, or Firm* — Bayes PLLC

(57) ABSTRACT

An enclosure having an outer surface with a vortex-induced vibration suppression function is provided. The outer surface of the enclosure is provided with a plurality of annular recesses surrounding the enclosure, such that alternately concave and convex annular recesses and annular bosses configured for disrupting a boundary layer of a laminar flow are formed on the outer surface of the enclosure. An outer
(Continued)

surface of the annular boss is provided with a plurality of air guiding grooves, and the plurality of air guiding grooves are distributed in a circumferential direction of the annular boss. The air guiding grooves are inclined upward or downward, such that part of an upwind incoming flow flowing to the annular boss can be guided into the annular recesses adjacent to the annular boss via the air guiding grooves. With the convex-concave outer surface, the cause of formation of the vortex-induced vibration can be prevented.

20 Claims, 13 Drawing Sheets

(51) Int. Cl.
    *F03D 80/00*     (2016.01)
    *F15D 1/14*     (2006.01)
    *E04H 12/34*     (2006.01)

(52) U.S. Cl.
    CPC ...... *E04H 12/342* (2013.01); *F05B 2240/912* (2013.01); *F05B 2260/96* (2013.01); *Y02E 10/72* (2013.01)

(58) Field of Classification Search
    CPC ....... F05B 2240/912; F05B 2240/3062; E04H 12/00; E04H 12/342; F15D 1/14; F15D 1/12; Y02E 10/72; B63B 2021/504; E04B 1/98
    See application file for complete search history.

(56) References Cited

U.S. PATENT DOCUMENTS

| | | | |
|---|---|---|---|
| 8,313,302 B2* | 11/2012 | Herbst | F03D 80/00 416/235 |
| 8,770,894 B1* | 7/2014 | Allen | E21B 17/01 405/211.1 |
| 9,140,385 B2* | 9/2015 | Meijer | F16L 1/26 |
| 9,476,171 B2* | 10/2016 | Georgakis | E01D 19/16 |
| 9,476,172 B2* | 10/2016 | Georgakis | D07B 5/005 |
| 2004/0051004 A1 | 3/2004 | Bearman et al. | |
| 2010/0314884 A1 | 12/2010 | Ollgaard et al. | |
| 2013/0330131 A1* | 12/2013 | Meijer | B63B 21/663 405/184.2 |

FOREIGN PATENT DOCUMENTS

| | | |
|---|---|---|
| CN | 102286919 A | 12/2011 |
| CN | 202326033 U | 7/2012 |
| CN | 204716148 U | 10/2015 |
| CN | 106351802 A | 1/2017 |
| CN | 107044385 A | 8/2017 |
| CN | 107461302 A | 12/2017 |
| DE | 102004030094 A1 | 1/2006 |
| DE | 202010002845 U1 | 7/2010 |
| EP | 3085956 A1 | 10/2016 |
| GB | 2362938 A | 12/2001 |
| WO | 2013127922 A1 | 9/2013 |

OTHER PUBLICATIONS

Extended European Search Report issued in corresponding European Application No. 18811121.5, dated Aug. 19, 2019, 6 pages.
First Office action issued in corresponding Australian Application No. 2018271387, dated Jul. 12, 2019, 7 pages.
Zdravkovich MM, "Review and Classification of Various Aerodynamic and Hydrodynamic Means for Suppressing Vortex Shedding", Journal of Wind Engineering and Industrial Aerodynamics, vol. 7, No. 2, Mar. 31, 1981, pp. 145-189, XP001023833, DOI: 10.1016/0167-6105(81)90036-2.

* cited by examiner

ENCLOSURE HAVING OUTER SURFACE WITH VORTEX-INDUCED VIBRATION SUPPRESSION FUNCTION

RELATED APPLICATIONS

This application is a national phase of International Application No. PCT/CN2018/084197, titled "ENCLOSURE HAVING OUTER SURFACE WITH VORTEX-INDUCED VIBRATION SUPPRESSION FUNCTION", filed on Apr. 24, 2018, which claims the benefit of priority to Chinese Patent Application No. 201710812913.7, titled "ENCLOSURE HAVING OUTER SURFACE WITH VORTEX-INDUCED VIBRATION SUPPRESSION FUNCTION", filed with the State Intellectual Property Office of People's Republic of China on Sep. 11, 2017, the entire contents of the above-identified applications are incorporated herein by reference.

FIELD

The present application relates to the technical field of enclosures, and in particular to an enclosure having an outer surface with a vortex-induced vibration suppression function.

BACKGROUND

Reference is made to FIG. 1A, which is a schematic view showing the configuration of a wind turbine.

The base of the wind turbine is a tower 10, which carries and encloses the entire system. Taking a tower 10 having a circular section as an example, the tower 10 may be a steel tower or a combination of a steel tower and a concrete tower. The tower 10 carries a nacelle 30, a generator, and a rotor 20 of the wind turbine. The wind turbine including the rotor 20 and the generator is used to obtain wind energy and convert the wind energy into electric energy. The converted electric energy is transmitted through a power transmission cable 40 or a power transmission busbar. The power transmission cable 40 shown in the figure is led out from the nacelle 30 and is position-limited by a cable retaining ring, and the cable retaining ring is arranged at a top of the tower 10 and is fixed to a cable retaining ring fixing plate 50. The power transmission cable 40 then passes a saddle bracket 60 and is suspended along an inner wall of the tower 100 to a converter cabinet 70. A tower door 80 is further provided at a lower end of the tower 10.

The electric energy obtained by the conversion is controlled by a switch cabinet of the wind turbine and is transmitted, by means of the power transmission cable 40 or the power transmission busbar, to a converter (in the converter cabinet 70) configured for performing the electric power conversion task, and after the electric energy is processed by the converter, the electric energy meeting the requirements of power grid access rule can be obtained. Therefore, the tower 10 can be regarded as a tower pole of the wind turbine, and mainly plays a supporting role in the wind turbine.

Moreover, the tower 10 bears wind loads generated by the nacelle 30, the rotor 20 and the generator, or the downwind vibrations and crosswind vibrations resulted from the structural wind loads, i.e., issues of wind-induced structural vibration.

Reference is made to FIG. 1B, which is a schematic view showing hoisting of the tower in segments.

The tower 10 is generally installed in segments currently, as shown in FIG. 1B. As an example, from bottom to top, a first tower segment 11, a second tower segment 12, a third tower segment 13, a fourth tower segment 14 and a fifth tower segment 15 are sequentially arranged. In the process of installing the wind turbine, the first tower segment 11 is installed on a ground foundation 90 of the tower 10 first, then other tower segments are hoisted segment by segment, and after the tower segments are connected one another, the top of the tower 10 (the fifth tower segment 15 in FIG. 1B) is connected to a yaw system of the nacelle 30, and the nacelle 30 is butted to the generator, and the generator (or a gear box) is butted to the rotor 20.

The specific hoisting process is described as follows.

Before hoisting the tower 10, a foundation ring of the ground foundation 90 connected to the first tower segment 11 is cleaned first, and multiple bolts (such as 120 bolts) are placed at an inner ring of the foundation ring after threads of the bolts are oiled, and meanwhile, a control cabinet of the wind turbine is hoisted into the foundation ring;

a hoisting tool is mounted at an upper end of the first tower segment 11, where hoisting the first tower segment 11 at the upper end thereof is performed by a main hoist, and at the same time, a hoisting tool is also mounted at a lower end of the first tower segment 11, and the task of hoisting the first tower segment at the lower end thereof is performed by an auxiliary hoist for the tower. The two hoists hoist the first tower segment at the same time. When the altitude of the first tower segment 11 is greater than the maximum diameter of the first tower segment 11, the main hoist hoists up the upper end of the first tower segment 11, and the auxiliary hoist stops working; when the first tower segment 11 is hoisted to be perpendicular to the ground, the auxiliary hoist is removed, and the hoisting tool at the lower end of the first tower segment 11 is removed;

after a flange surface of the first tower segment 11 is connected, the bolts are passed through the flange surface from bottom to top, and nuts are pre-mounted and then tightened by means of an electric wrench. The nuts are tightened for at least 3 times (till the hoisting procedure of the entire wind turbine is finished, the nuts for tower connection are then tightened by means of a torque wrench to achieve a required torque value); and the hoisting processes of the rest tower segments are the same as that of the first tower segment 11, and after the hoisting of the uppermost tower segment is finished, it is prepared to hoist the nacelle.

The above installation procedures of butting and connection are all carried out under conditions of unpredictable local winds in a small regional environment of a wind farm. Therefore, during the hoisting and installation processes, gusts of varying strengths or continuous light wind are often encountered. As described above, these gusts or continuous wind may induce vibrations of the tower, destroy the stability of the enclosure, and endanger the on-site personnel and equipment, and delay the installation period. For example, after the fourth tower segment 14 is hoisted, the fourth tower segment 14 may vibrate, such that the fifth tower segment 15 cannot be aligned with the fourth tower segment 14; and the fastened bolts may even be broken under the action of vibrations, thereby endangering the safety.

At present, it is clearly stipulated by the project safety requirements for the hoisting process in the wind power industry that, the hoisting of a blade group is prohibited when the wind speed is greater than 6 m/s; the hoisting of the nacelle is strictly prohibited when the wind speed is greater than 8 m/s, and the hoisting of the tower is strictly prohibited when the wind speed is greater than 10 m/s. Accordingly, the on-site hoisting progress and installation period are obviously limited by the wind conditions in the local region. For the construction of wind farms at high-altitude and high mountain regions, the project duration is even more apt to be adversely affected.

Reference is made to FIGS. 2 to 3F, FIG. 2 is a schematic view showing the structure of a tower having a certain vibration suppression function in the conventional technology; FIGS. 3A to 3F are schematic views showing the relationships between vortex shedding from a cylinder (bypassing flow detachment) and six intervals of Reynolds number. From FIG. 3A to FIG. 3F, the six intervals of Reynolds number (Re) are respectively Re<5, 5<Re<40, 40<Re<150, 150<Re<3×$10^5$, 3×$10^5$<Re<3×$10^6$, and Re>3×$10^6$.

According to different flowing patterns of airflow around object structures, the structures are sorted into blunt bodies and streamlined bodies such as aircraft wings or sails.

When Re<5, the fluid flow while adhering to an entire surface of a cylinder, i.e., the fluid flow without being detached from the surface of the cylinder.

When 5<Re<40, the flow is still symmetrical, but flow detachment occurs, two symmetrically arranged stable vortices are formed at a leeward side, and the vortices are elongated outwards as Reynolds number increases, resulting in deformation of the vortices.

When 40<Re<150, starting from that Reynolds number Re=40, the vortices will alternately shed from a rear side of the surface of the cylinder and flow into the fluid near the back of the cylinder to form a shear layer. The unstable shear layer soon rolls into vortices and flows downstream, forming the Karman vortex street, i.e., the vortex-induced vibration. The vortex shedding here is regular and periodic.

When 150<Re<300, which corresponds to a transition period from laminar flow to turbulent flow, during this period, the periodic vortex shedding is covered by irregular turbulent flow.

When 300<Re<3×$10^5$, which is referred to as a subcritical region, a wake flow of the cylinder after detachment is mainly presented as a turbulent wake flow. The vortex shedding begins to be irregular, and the period of the vortex shedding frequency can be roughly defined, however, the disturbing force during vortex shedding is random rather than symmetrical.

When 3×$10^5$<Re<3×$10^6$, which is referred to as a supercritical region, the vortex shedding point moves backwards, and the vortex street cannot be identified, and becomes a completely aperiodic vortical flow.

When 3×$10^6$<Re, which is referred to as a transcritical region, the wake flow at the rear side of the cylinder is very turbulent, however, a regular vortex shedding also appears.

When uniform airflow passes by (sweeps horizontally, flows around) a blunt body (cylindrical body), the periodic vortex shedding generated at the back of the cross section of the cylinder may produce a periodically varying action force, i.e., a vortex-induced force, on a structure (the contact surface of the tower). A lower end of the tower structure around which the airflow flows and the underground foundation constitute a single free end vibration system (i.e., an upper end of the tower is submerged in the airflow, and a lowermost end of the tower is fixed on the ground foundation). When the vortex shedding frequency consists with a certain order natural frequency of the tower structure, the periodic vortex-induced force (unbalanced force) applied on the tower surface may cause a response of vortex-induced vibration of the tower system structure.

The condition that the vortex shedding frequency is equal to the natural frequency of the vibration system of the tower of the structural system and the foundation thereof can be met only at a certain wind speed. However, the vibration system of the tower and the foundation thereof which has the natural frequency may have a certain feedback effect on the vortex shedding, to allow the frequency of the vortex shedding to be "captured" by the vibration frequency of the vibration system of the tower and the foundation thereof in a certain wind speed range, so that the vortex shedding frequency may not change with the changing of the wind speed within this wind speed range. This phenomenon is referred to as locking, and the locking may expand the wind speed range within which the vortex-induced resonance of the tower structure occurs.

The height of the tower of a modern large-scale megawatt-level wind turbine generator system can reach 60 m to 100 m. Main components such as a main frame, a sub-frame, a hub and blades (i.e., the rotor 20) and the like are mounted at the top of the tower 10. When the wind turbine generator system is in operation, in addition to the gravity of the components at the top of the tower 10 and the dynamic load generated by the rotation of the rotor, the tower 10 is impacted by the natural wind, including downwind and crosswind impacting forms. Bending moments and forces are applied onto the tower when the wind blows the rotor to rotate. The bending moments and forces generated in downwind direction are the main reasons for the damage of the tower 10. The vortices generated when the wind flows around the tower 10 may also cause lateral vibrations leading to the resonance damage of the tower 10.

When the wind blows over the tower 10, pairs of antisymmetrical vortices arranged alternately and rotating in opposite directions, i.e., Karman vortices, are generated at left and right sides of the wake flow. The vortices shed from the tower 10 at a certain frequency, to cause lateral vibration of the tower 10 perpendicular to the wind direction, which is also referred to as wind-induced lateral vibration, i.e., vortex-induced vibration. When the vortex shedding frequency is close to the natural frequency of the tower, the tower 10 is apt to resonate and therefore be damaged.

In FIG. 2, a spiral wire 10a (or a spiral plate) is wound around an outer wall of the tower 10, to suppress vortex shedding occurred on the surface of the tower 10. The spiral wire 10a (or the spiral plate) has different lateral vibration suppression effects when being arranged at different screw pitches. The increase of the height of the spiral wire 10a is beneficial for breaking the periodicity of the vortex street releasing, thus the generation and release of the vortex street are more irregular, which facilitates the suppression for the vortex-induced vibrations. Moreover, the noises and resistances generated in front and at the back of the tower also gradually increase, and the amplitude of the pitching vibration along the wind direction may increase.

The above technical solution has the following technical issues.

The vibration suppression effect achieved by the spiral wire 10a is still not ideal; and the coverage rate of the spiral wire 10a (or the spiral plate) on the tower surface may affect the effect of lateral vibration suppression. When the coverage rate reaches (or exceeds) 50%, the effect of lateral vibration suppression may be better. However, in this case, the serious adverse effects of the wind-induced noise caused by the spiral wire 10a (or the spiral plate) and the airflow on the living beings in the natural environment are prohibited by the ecological regulations. Based on this, even if the spiral wire 10a (or the spiral plate) is mounted, it is only used in the hoisting stage without considering a long-term operation.

In view of this, a technical issue to be addressed by those skilled in the art is to improve the situation that the installation of the wind turbine is restricted by regional wind conditions.

SUMMARY

In order to address the above technical issue, an enclosure having an outer surface with a vortex-induced vibration suppression function is provided according to the present application, the enclosure can suppress the vortex-induced vibration, so as to improve the situation that the installation of the enclosure is restricted by wind conditions, and the enclosure can keep suppressing the vortex-induced vibration after the installation.

An enclosure having an outer surface with a vortex-induced vibration suppression function is provided according to an embodiment of the present application. The outer surface of the enclosure is provided with a plurality of annular recesses surrounding the enclosure, such that annular recesses and annular bosses arranged in an alternately concave and convex manner are formed on the outer surface of the enclosure; and an outer surface of each of the annular bosses is provided with a plurality of air guiding grooves, and the plurality of air guiding grooves are distributed in a circumferential direction of the annular boss; the air guiding grooves are inclined upward or downward to guide part of an upwind incoming flow flowing to the annular boss into the annular recesses adjacent to the annular boss.

The enclosure according to the present application has the convex-concave outer surface, and the annular boss is provided with the air guiding grooves, the technical effects and mechanisms of such arrangement are as follows.

1. In this embodiment, an outer surface of a tower is a convex-concave outer surface, with the convex-concave outer surface, an airflow field under natural forces may be introduced to change a boundary layer formed by the original upwind incoming flow around the tower flowing around the tower in the conventional technology, thus changing the flow field of the upwind incoming flow flowing around the tower, disrupting the correlation of the flowing and flowing states of the boundary layers, and avoiding the consistency of fluctuating pressures, thereby fundamentally preventing the cause of formation of the vortex-induced vibration, that is, preventing the occurrence of a phenomenon of Karman vortex street at two sides of a leeward side at the back of the tower, preventing a vortex-induced response of the tower and the magnification of the vortex-induced response, and suppressing the vortex-induced vibration of the tower.

The arrangement of the air guiding grooves allows the kinetic energy of the upwind incoming flow flowing around the annular boss to be consumed, and the wind blows into the annular recesses after a wind direction is deviated, and intrudes into the annular recesses at a certain inclination angle, to achieve functions of pressure accumulation and disturbance, and further disrupt the correlation of the flowing and the flowing states and avoid the consistency of fluctuation of the boundary layers of the annular bosses and the annular recesses, thereby suppressing the vortex-induced vibration. That is, in the case that the air guiding grooves are combined with the alternately convex and concave outer surface, for the segment, provided with the convex-concave outer surface, of the tower, the whole laminar boundary layer is reliably disrupted, thereby suppressing the vortex-induced vibration.

What is especially important is that, the main mechanism of the tower according to the present application being provided with the convex-concave outer surface and the air guiding grooves to suppress the vortex-induced vibration lies in disrupting the boundary layer, so as to fundamentally eliminate the cause of formation of the vertex-induced vibration. Therefore, the annular recess has a small depth, which will not adversely affect the strength of the outer surface of the tower, and the noise generated may also be very low and can reach the environmental standard. Therefore, the arrangement according to the present application can be used not only in the installation stage, but also after installation for a long term. Preferably, the annular recess has a depth ranging from 2 mm to 5 mm, which is easy to manufacture, and can meet the requirement of disrupting the boundary layer which has a thickness generally ranging from only 1 mm to 2 mm, and with this depth, the annular recess can also be prevented from being filled with mould in a moist environment. The depth of the annular recess can be nearly neglected compared with that of a spiral groove formed by the spiral wire in the background technology, thus the noise issue of the spiral wire is addressed. Moreover, from the mechanism of suppressing vortex-induced vibration, this solution starts from the cause of formation of the vortex-induced vibration caused by the bypassing flow detachment, therefore, the effect of vortex-induced vibration suppression is better and other vibrations may not be caused.

2. When the upwind incoming flow flows around the tower, and passes by the annular recesses, the annular bosses and the air guiding grooves on the outer surface, the boundary layer on the outer surface of the tower can be turbulent in advance. The above air guiding grooves change the airflow direction, and the airflow intrudes into the annular recesses at a certain inclination angle, or the air is suctioned by the upwind incoming flow to accelerate and join into the boundary layer corresponding to the annular boss, both of which break the laminar flow characteristics of the original boundary layer, to allow the turbulent flow to occur in advance, so as to suppress the backflow of the bypassing flow detachment under an adverse pressure gradient, and to restrict or prevent the boundary layer from detaching from the outer surface of the tower, such that for a part of the segments or all of the segments of the tower, an aerodynamic coefficient C with respect to the bypassing airflow becomes small. In the case that a cross section of the structure is determined, and the aerodynamic coefficient C is reduced, a vibration amplitude may be reduced, to achieve the object of vibration suppression.

3. The inventors found from research that when the tower draws energy from the vortices having the same frequency with the tower itself, the structural vibration shape of an upper part of the tower changes, and the changed tower enclosure may in turn have an effect on the airflow, such that the energy concentrated at the fundamental frequency of the tower structure is greater and greater, thereby exciting the vortex-induced resonance of the tower structure.

In this solution, the outer surface of the tower is alternately convex and concave, which disturbs the upwind incoming flow. Besides, the air guiding grooves form upward and downward attack angles at the outer surfaces of the annular bosses (i.e., changing the local aerodynamic configuration), so as to allow the upwind incoming flow to have a certain turbulence intensity. In the case that the upwind incoming flow has a certain turbulence intensity, the upwind incoming flow has carried vortices with energy having various frequency components, the energy is highly dispersive, and is fluctuating. In this case, when the airflow flows over the outer surface of the tower, the integration effect of the outer surface of the tower on the upwind incoming flow occurs on the basis that vortices have presented in the upwind incoming flow. Moreover, an objective fact is that it is not easy to transform the vortices in the chaotic upwind incoming flow into vortices having the same fundamental vibration frequency as that of the tower, therefore, the vortex-induced vibrations can be suppressed by the disturbance caused by the convex-concave surfaces and the air guiding grooves.

4. Further, in the case that the convex-concave outer surface is provided on a part of the tower, due to the segment of the part of the tower, the upwind incoming flow flowing around the tower is as a whole divided into two sections of two situations, one section at the upper part with the convex-concave outer surface and the other section at the lower part without convex-concave outer surface; which also disrupts the correlation between the upper part and the lower part when the overall upwind incoming flow flows along the outer surface of the tower, prevents the consistency of the fluctuating pressures, and fundamentally prevents the cause of formation of the vortex-induced vibration.

It should be noted that, in the case that the convex-concave surface is arranged to correspond to the blade at a top of the tower, a perimeter of a part, having the annular recesses, of the tower is reduced, such that the airflow can pass faster, thus reducing the difference between the flowing state of the airflow here and the flowing state of the airflow at the back side of the blade at the top of the tower, thereby mitigating a stagnation phenomenon, and reducing the fatigue damage to the pitch varying bearing caused by a fluctuating load.

DETAILED DESCRIPTION OF EMBODIMENTS

For those skilled in the art to better understand the technical solutions of the present application, the present application is described in detail hereinafter with reference to the drawings and embodiments.

Figure 1A:
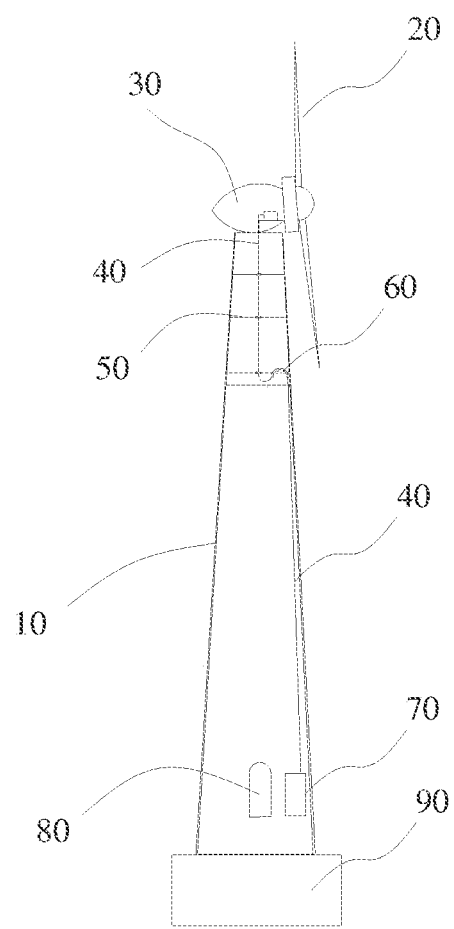
FIG. 1A is a schematic view showing the configuration of a wind turbine.
Figure 1B:
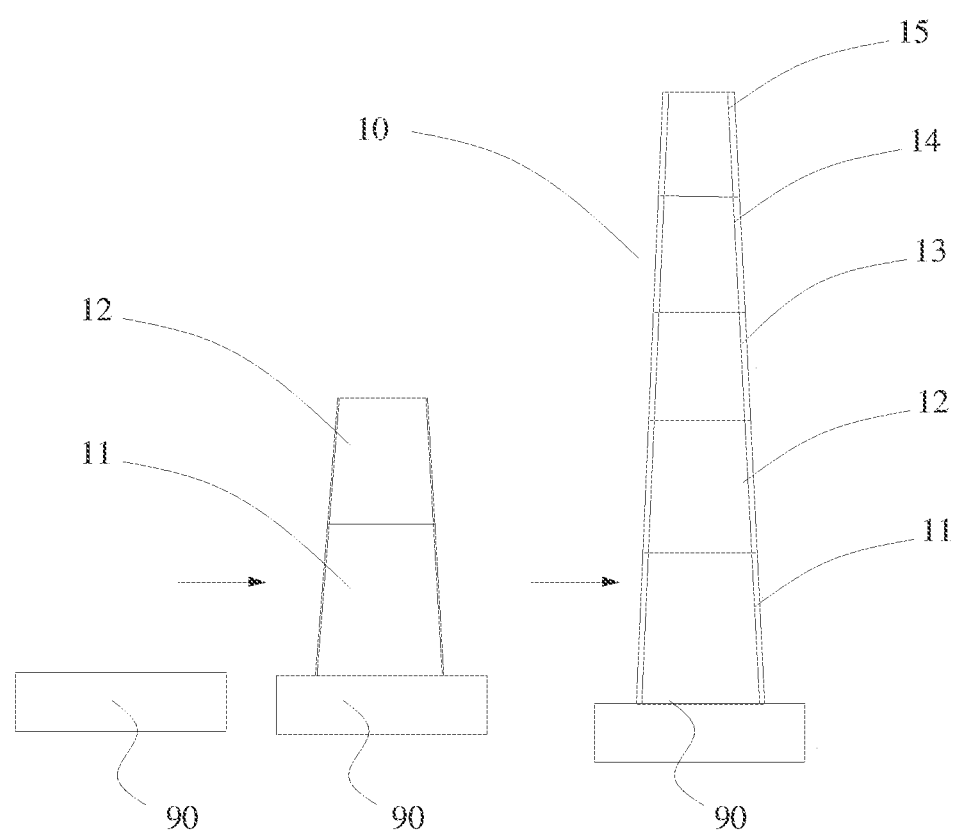
FIG. 1B is a schematic view showing a tower being hoisted in segments.
Figure 2:
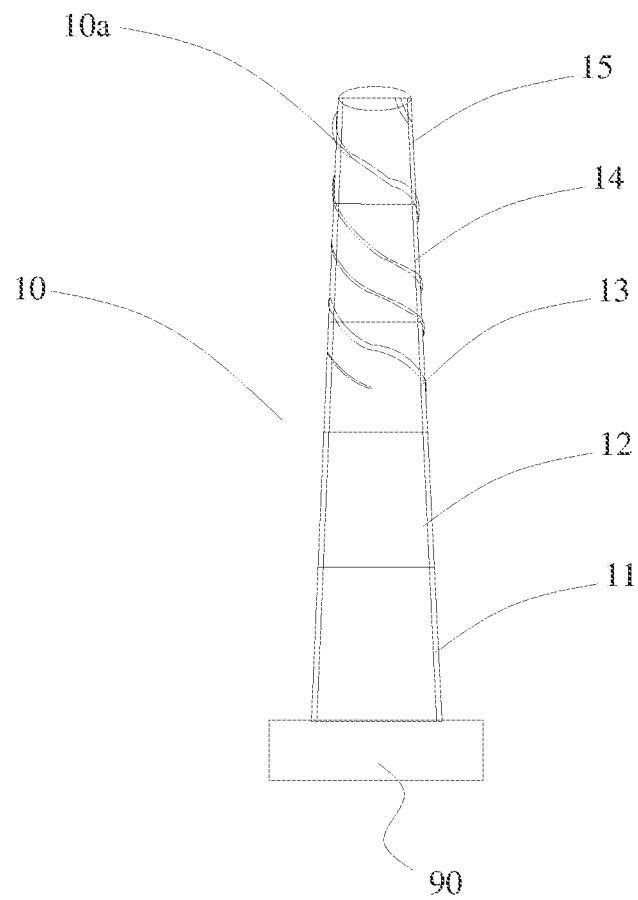
FIG. 2 is a schematic view showing the structure of a tower having a certain vibration suppression function.
Figure 3A:
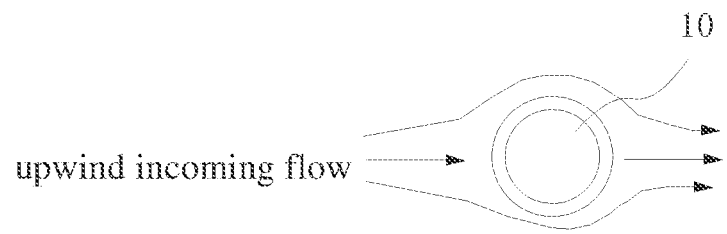
FIGS. 3A to 3F are schematic views showing the relationships between vortex shedding from a cylinder (bypassing flow detachment) and six intervals of Reynolds number respectively.
Figure 3B:
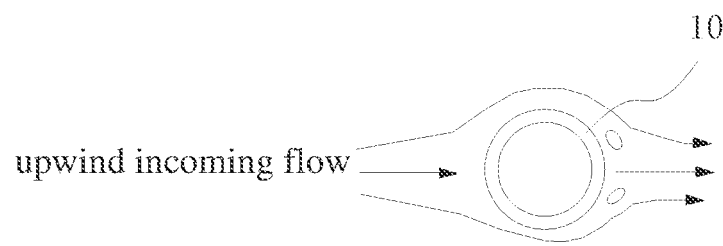
Figure 3C:
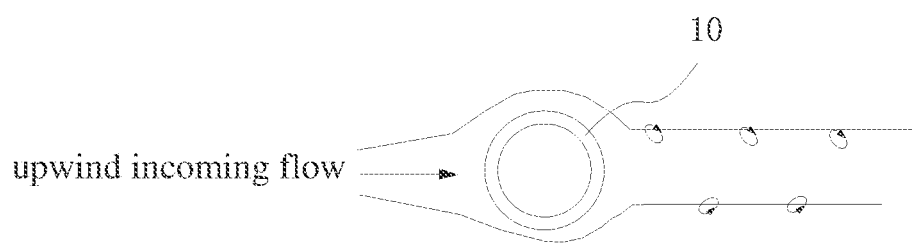
Figure 3D:
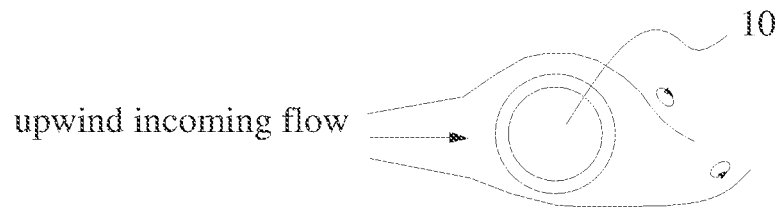
Figure 3E:
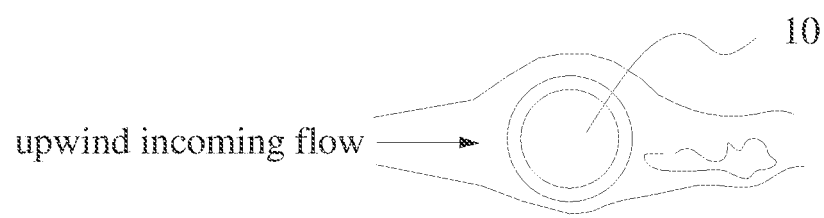
Figure 3F:
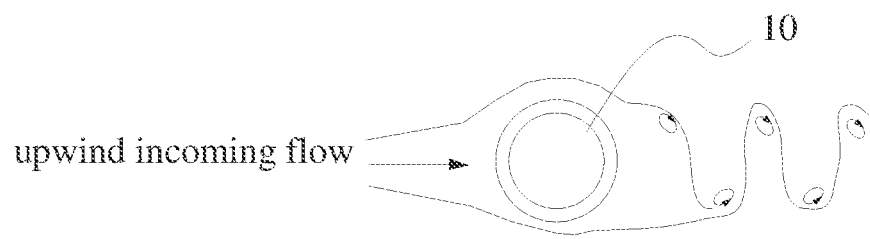
Figure 4:
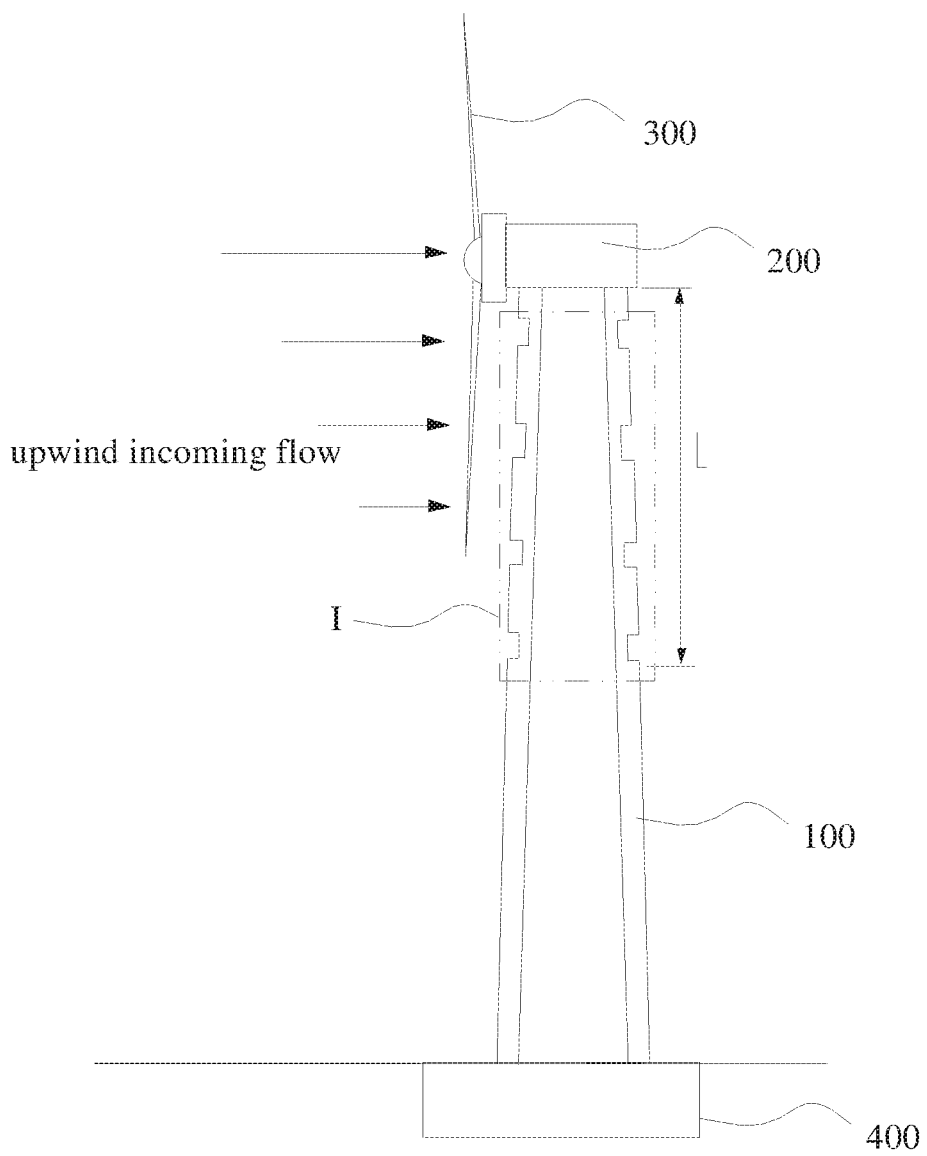
FIG. 4 is a schematic view showing the structure of a first embodiment of an enclosure according to the present application.
Figure 5:
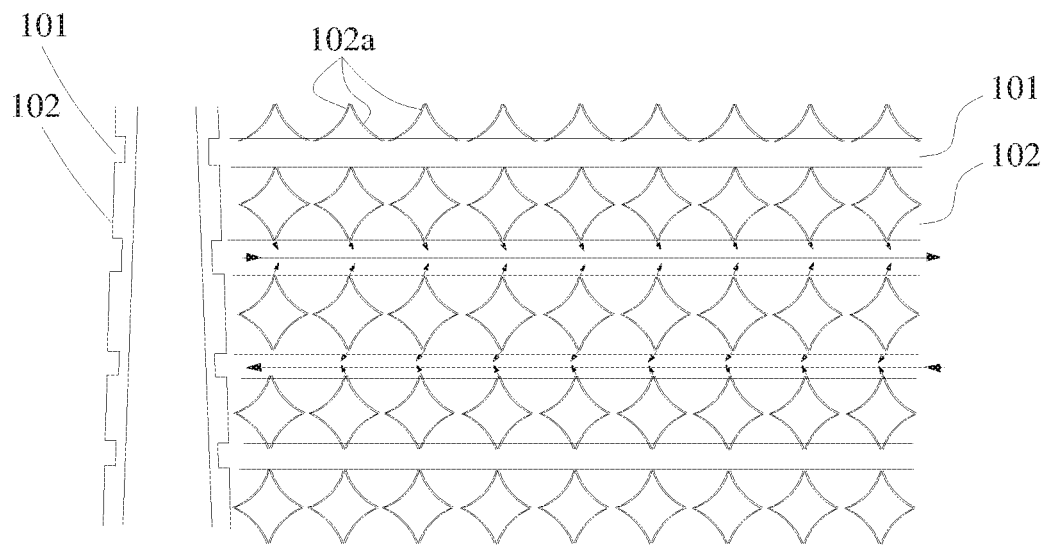
FIG. 5 is a schematic view showing a part of an outer surface in FIG. 4 being expanded in a plane.
Figure 6:
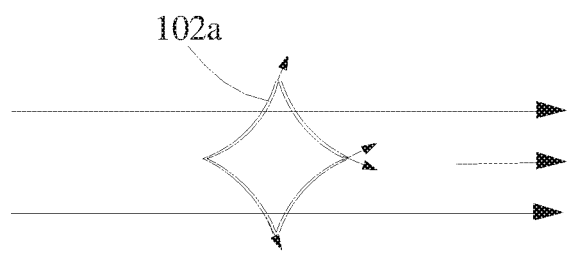
FIG. 6 is a schematic view showing four adjacent air guiding grooves in an annular boss in FIG. 4.

Referring to FIG. 4, FIG. 4 is a schematic view showing the structure of a first embodiment of an enclosure according to the present application; and FIG. 5 is a schematic view showing a part of an outer surface in FIG. 4 being expanded in a plane. In order to facilitate viewing and understanding, a front view of a tower 100 is at a left side of FIG. 5, a schematic view showing an outer surface of the tower 100 being expanded is at a right side of FIG. 5, and FIGS. 8, 10, 11 and 14 illustrate in the same way. FIG. 6 is a schematic view showing four adjacent air guiding grooves in an annular boss in FIG. 4.

The enclosure is specifically a tower 100 of a wind turbine, and the tower 100 is also taken as an example for illustration hereinafter. A nacelle 200 is provided at a top of the tower 100, and the nacelle 200 is connected to a generator and a hub, the hub is connected to blades 300, and a bottom of the tower 100 is connected to a tower foundation 400.

As shown in FIG. 5, the outer surface of the tower 100 is provided with a plurality of annular recesses 101 surrounding the tower 100, such that a plurality of annular recesses 101 and annular bosses 102 arranged in an alternately concave and convex manner are formed on the outer surface of the tower 100. In addition, an outer surface of the annular boss 102 is provided with a plurality of air guiding grooves 102a, and the plurality of air guiding grooves 102a are distributed in a circumferential direction of the annular boss 102, that is, distributed in a circumferential direction of the tower 100. Further, the air guiding grooves 102a arranged in the annular boss 102 are inclined upward or downward, and are in communication with corresponding annular recesses 101. Thus, part of an upwind incoming flow flowing to the annular boss 102 enters the air guiding grooves 102a and then forms airflow with wind directions deviated upward or downward, and the airflow is guided into adjacent annular recesses 101.

As shown in FIG. 5, the annular recess 101 in a second row is taken as an example, and a row of air guiding grooves 102a, close to the annular recess 101, of each of annular bosses 102 adjacently above and below the annular recess (each of the annular bosses 102 is annular-shaped, and the air guiding grooves 102a arranged in the annular boss 102 and distributed in the circumferential direction form a "row" when the annular boss is expanded) guide part of the upwind incoming flow flowing around the annular bosses 102 into the annular recess 101, that is, airflow converges into the annular recess 101 from both an upper side and a lower side thereof. In addition, as shown in FIG. 6, when there is much airflow in the annular recess 101, driven by the upwind incoming flow, the air guiding groove 102a may suction part of airflow from the annular recess 101. In FIG. 6, two air guiding grooves 102a at a right side of the four air guiding grooves 102a may suction air from corresponding annular recess 101, and the drawn airflow is accelerates and joins into a boundary layer on the outer surface of the annular boss 102.

The technical effects and mechanism of such arrangement of the convex-concave outer surface and the air guiding grooves are as follows.

1. In this embodiment, the outer surface of the tower 100 is a convex-concave outer surface, with this convex-concave outer surface, an airflow field under natural forces may be introduced to change a boundary layer formed by the original upwind incoming flow around the tower 100 flowing around the tower 100 in the conventional technology, thus changing the flow field of the upwind incoming flow flowing around the tower 100, disrupting the correlation of the flowing and flowing states of the boundary layers, and avoiding the consistency of fluctuating pressures, thereby fundamentally preventing the cause of formation of the vortex-induced vibration, that is, preventing the occurrence of a phenomenon of Karman vortex street at two sides of a leeward side at the back of the tower 100, preventing a vortex-induced response of the tower 100 and the magnification of the vortex-induced response, and suppressing the vortex-induced vibration of the tower 100.

The arrangement of the air guiding grooves 102a allows the kinetic energy of the upwind incoming flow flowing around the annular boss 102 to be consumed, and the wind blows into the annular recesses 101 after a wind direction is deviated, and intrudes into the annular recesses at a certain inclination angle, to achieve functions of pressure accumulation and disturbance, and further disrupt the correlation of the flowing and the flowing states and avoid the consistency of fluctuation of the boundary layers of the annular bosses 102 and the annular recesses 101, thereby suppressing the vortex-induced vibration. That is, in the case that the air guiding grooves 102a are combined with the alternately convex and concave outer surface, for the segment, provided with the convex-concave outer surface, of the tower 100, the whole laminar boundary layer is reliably disrupted, thereby suppressing the vortex-induced vibration.

What is especially important is that, the main mechanism of the tower 100 according to the present application being provided with the convex-concave outer surface and the air guiding grooves 102a to suppress the vortex-induced vibration lies in disrupting the boundary layer, so as to fundamentally eliminate the cause of formation of the vortex-inducing. Therefore, the annular recess 101 has a small depth, which will not adversely affect the strength of the outer surface of the tower 100, and the noise generated may also be very low and can reach the environmental standard for noise. Therefore, the arrangement according to the present application can be used not only in the installation stage, but also after installation for a long term. Preferably, the annular recess 101 has a depth ranging from 2 mm to 5 mm, which is easy to manufacture, and can meet the requirement of disrupting the boundary layer which has a thickness generally ranging from only 1 mm to 2 mm, and with this depth, the annular recess can also be prevented from being filled with mould in a moist environment. The depth of the annular recess can be nearly neglected compared with that of a spiral groove formed by a spiral wire in the background technology, thus the noise issue of the spiral wire is addressed. Moreover, from the mechanism of suppressing the vortex-induced vibration, this solution starts from the cause of formation of the vortex-induced vibration caused by the bypassing flow detachment, therefore, the effect of vortex-induced vibration suppression is better and other vibrations may not be caused.

2. When the upwind incoming flow flows around the tower 100, and passes by the annular recesses 101, the annular bosses 102 and the air guiding grooves 102a on the outer surface, the boundary layer on the outer surface of the tower 100 can be turbulent in advance. The above air guiding grooves 102a change the airflow direction, and the airflow intrudes into the annular recesses 101 at a certain inclination angle, or the air is suctioned by the upwind incoming flow to accelerate and join into the boundary layer corresponding to the annular boss 102, both of which break the laminar flow characteristics of the original boundary layer, to allow the turbulent flow to occur in advance, so as to suppress the backflow of the bypassing flow detachment under an adverse pressure gradient, and to restrict or prevent the boundary layer from detaching from the outer surface of the tower 100, such that for a part of the segments (the segments of a part of the tower provided with the annular bosses 102 and the annular recesses 101) or all of the segments of the tower 100, an aerodynamic coefficient C with respect to the bypassing airflow becomes small because that the resistance in flowing around the tower 100 is reduced.

When the vortex-induced resonance of the tower 100 structure occurs, a vortex-induced force (i.e., an unbalanced force) acting on the outer surface of the tower 100 structure is approximately a simple harmonic force F (t):

$$F(t) = F_0 \sin \omega t \qquad (1)$$

where, $\omega(Re, St)$ is a frequency of the vortex shedding, and $\omega t$ as a whole is a variable;

$$Re = \frac{\rho u d}{\mu},$$

Re is Reynolds number and is a dimensionless number;

$F_0$ is an amplitude value of the vertex-induced force, $F_0 = (\rho U^2/2)CD$;

$\rho$ is the density of the upwind incoming flow of the tower 100;

U is a wind speed of the upwind incoming flow of the tower 100;

C is an aerodynamic coefficient of a section of the tower 100 structure; the aerodynamic coefficient is also called a wind load shape coefficient, which is a ratio of a pressure (or suction) formed by the wind on a surface of an engineering structure to a theoretical wind pressure calculated according to the wind speed of the incoming flow. The aerodynamic coefficient reflects the distribution of a stable wind pressure on the engineering structure and a surface of a building, and varies with the airflow direction, and the shape, scale, shielding conditions of the building and the like;

D is a characteristic dimension when the outer surface of the tower 100 structure is swept across by a fluid, and is the characteristic dimension of a spatial structure formed by an obstacle facing the fluid when the fluid bypasses the obstacle and flows around the obstacle, which is a general term in the field of heat transfer. In this embodiment, it refers to the characteristic dimension of a contact surface, in contact with the fluid (the fluid herein is the airflow), of the enclosure (a shape of the outer surface of the tower), generally a structural width perpendicular to the wind direction is employed, i.e., an outer diameter of the tower 100 at a corresponding height.

$R_e$ is Reynolds number.

The variation of an amplitude of the lateral vibration of the tower 100 structure caused by the vortex-induced force is:

$$A(t) = \frac{\pi}{\delta} \frac{1}{K}(\rho U^2/2)CD\sin\omega t \qquad (2)$$

where, K is the stiffness of a structural system of the tower 100 (which may include the nacelle); and δ is a logarithmic decrement (about 0.05).

When the wind speed of the upwind incoming flow reaches a certain suitable value and continues to act for a certain period of time, vortex-induced resonance of the tower 100 structure may occur, and the amplitude A of the vibration here is:

$$A = \frac{\pi}{\delta} \frac{\rho C f^2}{2K(St)} D^3 \qquad (3)$$

where, $$St = \frac{fD}{U}$$

which is Strouhal number. The definition of Strouhal number illustrates the relationship between the vortex shedding frequency, the wind speed, and a diameter of a cylinder;

f is the vortex shedding frequency, Hz;

U is the wind speed of the upwind incoming flow of the tower 100; and

D is a characteristic dimension when the outer surface of the tower 100 structure is swept across by the fluid.

In this embodiment, D refers to the outer diameter of the tower 100 at different heights. The outer diameter may change. When the upwind incoming flow flows around the tower 100 not in a horizontal direction but at a certain inclination angle, a path of the flow bypassing a periphery of the tower 100 is approximately oval-shaped, like the description of the above aerodynamic configuration. In this case, the characteristic dimension D is an equivalent diameter (a technical term in heat transfer, which is a diameter of an imaginary circular cross-section, i.e., the diameter of the circular cross-section converted on the basis that a perimeter of the circular cross-section is equal to that of a non-circular cross-section) of the oval-shaped aerodynamic configuration. In this case, a boundary that is wetted by the fluid or in contact with the fluid becomes more streamlined, and is less blunt. Viewed from the vibration form, vortex-induced resonance is an amplitude-restricted vibration having dual characteristics of being self-excited and forced.

Figure 7:
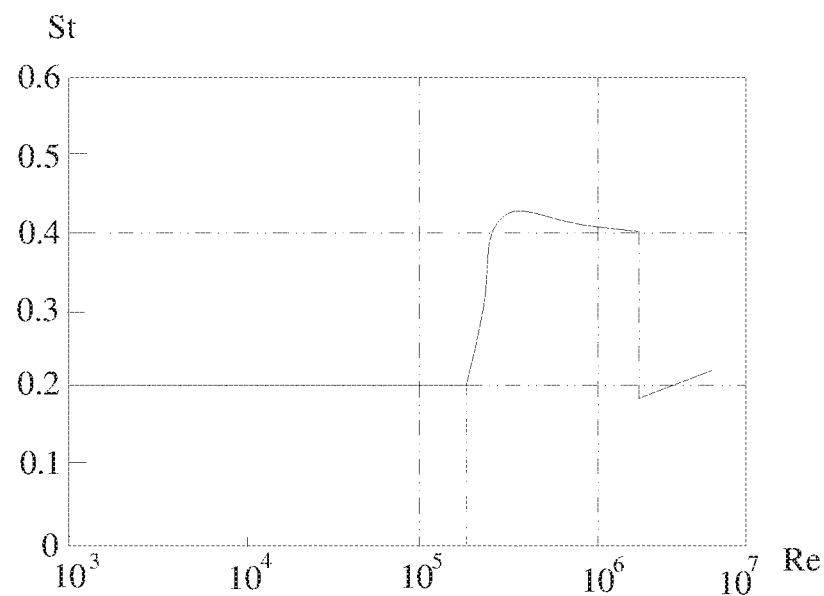
FIG. 7 is a schematic diagram showing the relationship between Strouhal number and Reynolds number at an outer surface of the tower.
Figure 8:
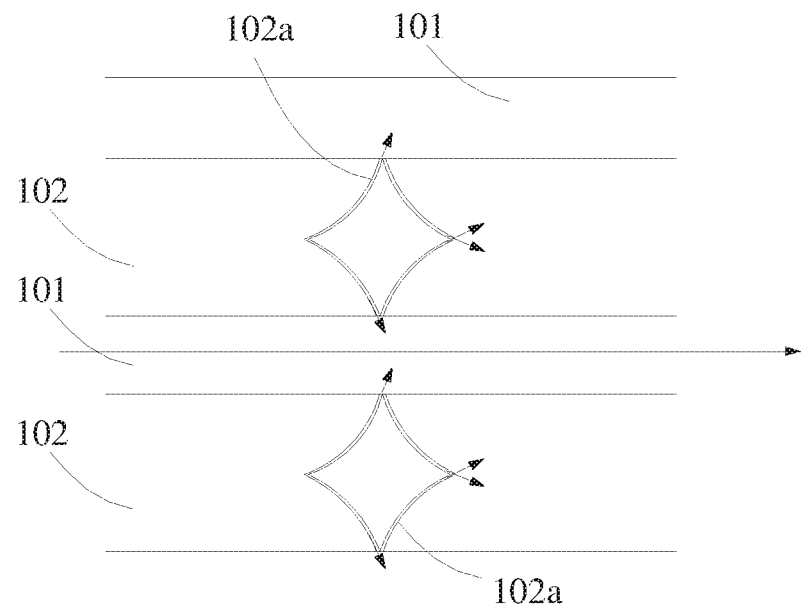
FIG. 8 is a partial schematic view showing that the positions of air outlets of an upper air guiding groove and a lower air guiding groove of an annular recess in FIG. 6 correspond to each other.

The Strouhal number can be obtained according to the Reynolds number. Reference may be made to FIG. 7 for the relationship between the Strouhal number with the Reynolds number. FIG. 7 is a schematic diagram showing the relationship between the Strouhal number and the Reynolds number at the outer surface of the tower, wherein the horizontal axis represents the Reynolds number, and the vertical axis represents the Strouhal number. Before the Reynolds number reaches $2\times10^5$, the Strouhal number is a constant 0.20; after that, as the Reynolds number increases, the Strouhal number first jumps to 0.30, then increases to 0.43, and then when the Reynolds number equals $2\times10^6$, the Strouhal number drops back to 0.2. Therefore, the Strouhal number, D and U are parameters that can be obtained, and f can also be calculated according to the formula of the Strouhal number, and accordingly, the vibration amplitude A can also be calculated.

As can be seen from the formula (3) that, in the case that the cross section of the structure is determined, and the aerodynamic coefficient C is reduced, the vibration amplitude may be reduced, to achieve the object of vibration suppression.

3. The inventors found from research that when the tower 100 draws energy from the vortices having the same frequency with the tower itself, the structural vibration shape of an upper part of the tower 100 changes, and the changed tower 100 enclosure may in turn have an effect on the airflow, such that the energy concentrated at the fundamental frequency of the tower 100 structure is greater and greater, thereby exciting the vortex-induced resonance of the tower 100 structure.

In this solution, the outer surface of the tower 100 is alternately convex and concave, which disturbs the upwind incoming flow. Besides, the air guiding grooves 102a form upward and downward attack angles near an upper side and a lower side of the outer surface of each of the annular bosses 102 (i.e., changing the local aerodynamic configuration), so as to allow the upwind incoming flow to have a certain turbulence intensity. In the case that the upwind incoming flow has a certain turbulence intensity, the upwind incoming flow has carried vortices with energy having various frequency components, the energy is highly dispersive, and is fluctuating. In this case, when the airflow flows over the outer surface of the tower 100, the integration effect of the outer surface of the tower 100 on the upwind incoming flow occurs on the basis that vortices have presented in the upwind incoming flow. Moreover, an objective fact is that it is not easy to transform the vortices in the chaotic upwind incoming flow into vortices having the same fundamental vibration frequency as that of the tower 100, therefore, the vortex-induced vibrations can be suppressed by the disturbance caused by the convex-concave surfaces and the air guiding grooves 102a.

4. In this embodiment, the annular recesses 101 and the annular bosses 102 may be arranged at the upper part of the tower 100. It can be understood that, the convex-concave outer surface may be provided on the whole tower 100 or other segments of the tower 100, which can also function to suppress the vortex-induced vibration. However, compared with a lower part of the tower, the vibration of the upper part is more significant, and may cause a stronger disrupting force of vibration, thus a demand for vibration suppression is greater. Therefore, the convex-concave outer surface may only be provided on the upper part to meet the demand for vibration suppression of the tower 100. As shown in FIG. 4, the convex-concave outer surface is arranged within a height L downward from the top of the tower 100, which is indicated by a dashed box.

Further, in the case that the convex-concave outer surface is provided on the upper part of the tower 100, due to a part of the segments of the tower 100 (the segment having the convex-concave outer surface), the upwind incoming flow flowing around the tower 100 is as a whole divided into two sections of two situations, one section at the upper part with the convex-concave outer surface and the other section at the lower part without the convex-concave outer surface; which also disrupts the correlation between the upper part and the lower part when the overall upwind incoming flow flows along the outer surface of the tower 100, and prevents the consistency of the fluctuating pressures, thereby fundamentally preventing the cause of formation of the vortex-induced vibration.

As a whole, the airflow flowing around the tower 100 having a segment at the upper part with the convex-concave outer surface closely adheres to the outer surface of the tower 100, and the phenomena of the boundary layer detachment and the Karman vortex street may not occur on the outer surface at the back of the tower, which hinders the formation of vortices at two sides of the back of the upper part of the tower 100; while the bypassing airflow at the lower part has a low speed, and is not disturbed by the convex-concave outer surface. In essence, the above solution thoroughly disrupts the situation that the frequencies of vortex shedding at the upper part and the lower part of the tower 100 are consistent in the conventional technology, thus the vortex shedding at the upper part and the lower part may co-act to weaken, reduce or prevent the vortex-induced resonance response when the bypassing flow detachment occurs in the boundary layer on the outer surface of the tower 100, and thereby preventing the vortex-induced vibration at the upper part of the tower 100. The second situation is that the presentation of the structural feature (the convex-concave surface) on the surface of the segment at the upper part disrupts the correlation between the parts, and prevents the consistency of the fluctuating pressures, thereby fundamentally preventing the cause of formation of the vertex-induced vibration.

Correlation is an important feature of fluctuating wind, here it relates to fluctuating wind speeds at two points in the space or fluctuating pressures at two points at different heights on the surface of the tower 100.

A correlation coefficient ρ is defined as $$\rho = \frac{\overline{u'(Z_1)u'(Z_2)}}{\sigma_u(Z_1)\sigma_u(Z_2)},$$

at two different heights ($Z_1$, $Z_2$), the covariance of the fluctuating wind speeds is defined as follows:

$$\overline{u'(Z_1)u'(Z_2)} = \frac{1}{T}\int_0^T [U(Z_1,t) - \overline{U}(Z_1)][U(Z_2,t) - \overline{U}(Z_2)]dt,$$

therefore, the covariance is the time average of the product of the fluctuating wind speeds at the two heights. The wind speed values at the right side of the equation have their respective average values $\overline{U}(Z_1)$ and $\overline{U}(Z_2)$ subtracted respectively.

In mathematics, the formula of standard deviation can be expressed as:

$$\sigma_u = \left\{\frac{1}{T}\int_0^T [U(t) - \overline{U}(Z)]dt\right\}^{\frac{1}{2}},$$

where, U(t) represents a wind speed component in a direction of an average wind speed, and is equal to $\overline{U}(Z)\pm u$; and u(t) is a turbulence component in the downwind direction, that is, the fluctuating wind speed component in the direction of the average wind speed.

The numerator indicates that wind speeds at two different heights of the tower 100 are different and represents the covariance of the fluctuating wind speeds.

The covariance is the time average of the product of the fluctuating wind speeds at the two heights.

The overall intensity of turbulence can be measured by a standard deviation or a root mean square of the wind speeds, an average component is subtracted from each of the wind speeds, then the remainders are quantified by the deviations, the deviations are squared and then averaged, and the averaged value is finally extracted, to obtain a physical quantity having a wind speed unit, thus obtaining the standard deviation. According to the equation of definition of the correlation coefficient, the covariance of wind speeds at different heights is divided by the standard deviation thereof to obtain the correlation coefficient between the two wind speeds at different heights. The smaller the correlation, the better. With a small correlation, the frequencies of vortices at different heights after the vortices are formed can be hindered to be consistent, and the accumulation and increasing of the vortex-induced resonance energy caused by the consistency of the frequencies is destroyed, that is, preventing the growth of the vortex-induced resonance, and even causing the vortex-induced resonance to disappear.

The mean square value of the total fluctuating wind force on the surface of the tower 100 structure is indicated as: $\overline{F'^2}=f[\rho(y_i-y_j)]$, where, $y_i$, $y_j$ are two points in the vertical direction, and $\rho(y_i-y_j)$ is the correlation coefficient of the fluctuating wind forces of each segment.

It should be noted that FIG. 4 shows that a convex-concave outer surface is provided on a segment having a height L below the top of the tower 100, and the height L is preferably equal to or greater than a length of a blade 300. It should be known that during the rotation of the blade 300, the blade 300 may periodically appear above the top of the tower 100 or corresponding to the outer surface of the tower 100. When the blade 300 is above the top, a back side of the blade 300 (the side facing the upwind incoming flow is a front side) is the airflow; and when the blade 300 is at a position corresponding to the outer surface of the tower 100, the back side of the blade 300 directly faces the outer surface of the tower 100, at this time, a tower shadow phenomenon of airflow stagnation is apt to occur at the back side of the blade 300, causing the fluctuating reduction of the bending moment of the blade 300 in a downwind direction when the corresponding blade 300 passes by the front side of the tower 100, which is transmitted to a root of the blade to cause fatigue damage to the pitch varying bearing caused by a fluctuating load.

In the case that the convex-concave surface is provided, the perimeter of the part, having the annular recess 101, of the tower is reduced, such that the airflow can pass faster, thus reducing the difference between the flowing state of airflow here and the flowing state of the airflow at the back side of the blade 300 at the top of the tower, thereby mitigating a stagnation phenomenon, and reducing the fatigue damage to the pitch varying bearing caused by the fluctuating load.

In this embodiment, each of the annular bosses 102 is provided with air guiding grooves 102a configured to guide the upwind incoming flow into the annular recesses 101 adjacently above and below the annular boss. As shown in FIG. 5, with this arrangement, the airflow converges into each of the annular recesses 101 not only from top to bottom, but also from bottom to top, which enhances the disturbance to the boundary layer in the annular recess 101, and the outer surface of the annular boss 102 allows the airflow to be distributed both upward and downward, to enhance the disturbance to the boundary layer on the outer surface of the annular boss 102, so that the disturbance to the airflow on both the annular boss 102 and the annular recess 101 is enhanced, thereby further enhancing the capability of suppressing the vortex-induced vibration.

With continued reference to FIGS. 5 to 8, FIG. 8 is a partial schematic view showing that the positions of air outlets of an upper air guiding groove 102a and a lower air guiding groove 102a of the annular recess 101 in FIG. 6 correspond to each other.

Positions of air guiding grooves 102a above and below an annular recess for guiding the upwind incoming flow into the same annular recess 101 are in one-to-one correspondence, that is, the positions of the air outlets of the air guiding grooves 102a correspond to each other, thus after the airflow drawn from the two air guiding grooves 102a adjacently above and below the annular recess 101 converges into the annular recess 101, the airflow may collide, which causes vortices, enhances the disturbance and increases the overall vortex momentum, thus contributing to the prevention of the occurrence of the bypassing flow detachment phenomenon.

Herein, the air outlet is further illustrated, both of two end openings of the air guiding groove 102a may serve as air outlets, however, for one wind direction, it is obvious that one end opening of the air guiding groove 102a is an air inlet and the other is an air outlet. FIG. 6 is taken as an example, when the wind direction is from left to right, the left end opening is the air inlet, and the right end opening is the air outlet, and when the wind direction is from right to left, the left end opening is the air outlet and the right end opening is the air inlet.

Figure 9:
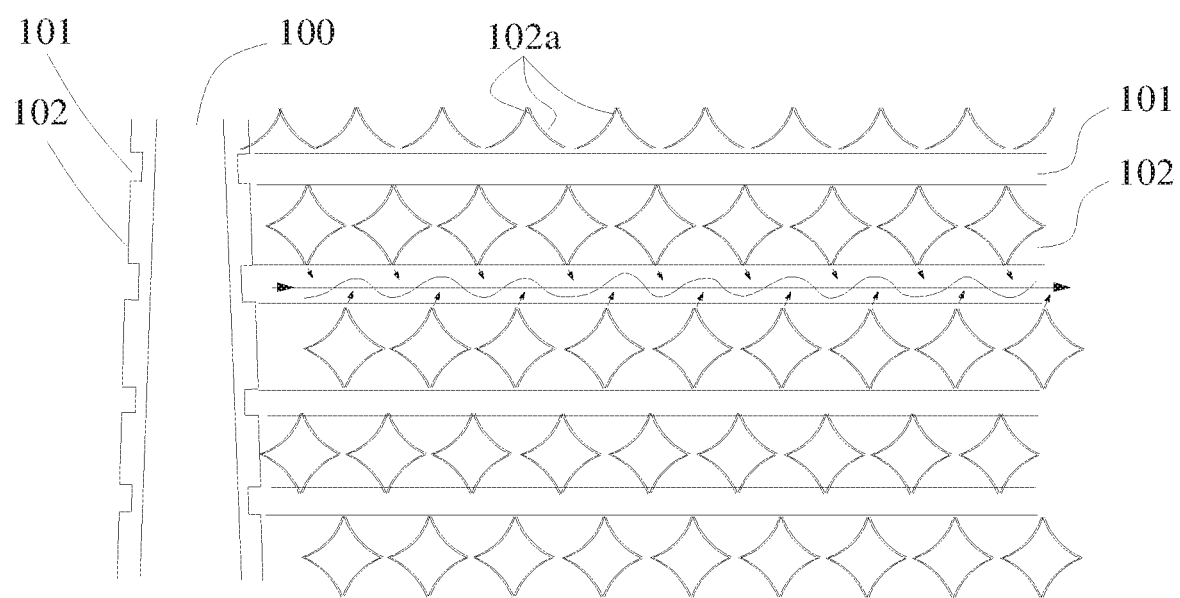
FIG. 9 is a schematic view showing the structure of a part of an outer surface of a tower according to a second specific embodiment being expanded in a plane.
Figure 10:
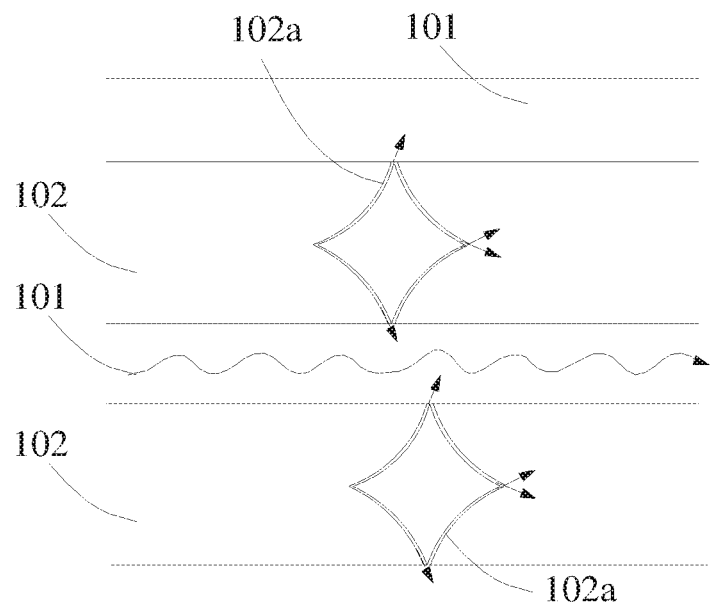
FIG. 10 is a partial schematic view showing that the positions of air outlets of an upper air guiding groove and a lower air guiding groove adjacent to an annular recess in FIG. 9 are staggered with respect to each other.

Reference may also be made to FIGS. 9 and 10, FIG. 9 is a schematic view showing the structure of a part of the outer surface of the tower 100 according to a second specific embodiment being expanded in a plane; and FIG. 10 is a partial schematic view showing that the positions of the air outlets of the air guiding grooves 102a adjacently above and below the annular recess 101 in FIG. 9 are staggered with respect to each other.

In FIGS. 9 and 10, the positions of the air guiding grooves 102a above and below an annular recess guiding the upwind incoming flow into the same annular recess 101 are staggered with respect to each other, that is, the positions of the air outlets of the air guiding grooves 102a are staggered with respect to each other in the circumferential direction, thus after the airflow drawn from the two air guiding grooves 102a adjacently above and below the annular recess converges into the annular recess 101, the airflow may flow in the annular recess 101 to excite to form the fluctuating flow, and the fluctuation is specifically in a height direction, thus generating a fluctuating drive force. The fluctuating drive force can cause the transition (the transition of the boundary layer from the laminar flow state to the turbulent flow state) of the boundary layer to occur in advance, to form a turbulent flow, which has a higher momentum to suppress the occurrence of the backflow phenomenon of the bypassing flow detachment under the adverse pressure gradient, to further restrain or prevent the boundary layer from being detached from the surface of the tower 100, thereby suppressing the vortex-induced vibration caused by the bypassing flow detachment.

As shown in FIGS. 5 and 9, each of the annular bosses 102 is provided with two rows of air guiding grooves 102a, and the air guiding grooves 102a in each of the two rows are arranged to be alternately inclined upward and downward in the circumferential direction in sequence. As shown in FIG. 6, four adjacent air guiding grooves 102a form a shape similar to an inwardly retracted rhombus. When the wind direction is from left to right, the air guiding grooves 102a at the left side of the rhombus play a main role in guiding the airflow, and when the wind direction is from right to left, the air guiding grooves 102a at the right side of the rhombus play the main role in guiding the airflow. That is, the air guiding grooves 102a with different inclination directions are alternately arranged, such that regardless of the variation of the wind direction, in each of the rows of the air guiding grooves 102a, there are air guiding grooves 102a capable of guiding airflow into the corresponding annular recess 101, which is not limited by the variation of the wind direction.

In this case, two rows of air guiding grooves 102a are provided, thus, regardless of the variation of the wind direction, the air guiding grooves 102a in the annular boss 102 can always guide the airflow into the annular recesses 101 adjacently above and below the annular boss 102. It can be understood that, in the case that the air guiding grooves 102a in an upper row of the two rows of the air guiding grooves 102a in the annular boss 102 in FIG. 5 face a same direction, only when the wind direction is from left to right or from right to left, the airflow flowing around the annular boss 10 can be guided into the annular recess 101. Of course, the arrangement that the two upper and lower rows of air guiding grooves 102a have different inclination directions may also meet the requirement for guiding the airflow under conditions of different wind directions, except that the airflow is guided into a plurality of annular recesses 101 rather than all of the annular recesses 101.

On the basis that the air guiding grooves 102a in a row are arranged to have opposite inclination directions sequentially, the upper and lower positions of two rows of the air guiding grooves 102a may be arranged in one-to-one correspondence, and the inclination directions thereof are also opposite. As described above, in the case that there is a large amount of airflow in the annular recess 101 and the airflow is suctioned out under the action of the upwind incoming flow, for the two rows of air guiding grooves 102a which are in one-to-one correspondence and have opposite inclination directions in the same annular boss 102, the airflow suctioned from the annular recesses above and below the annular boss may converges to "blow" to the outer surface of the annular boss 102. As shown in FIG. 6, the two air guiding grooves 102a at the right side suction airflow from the annular recesses 101 above and below the annular boss respectively and then "blow the airflow" to the right side, to disturb the boundary layer on the outer surface of the annular boss 102, disrupt the laminar flow, and also cause the transition of the boundary layer to occur in advance, thus suppressing the vortex-induced vibration caused by the bypassing flow detachment.

Of course, the two rows of air guiding grooves 102a may also be staggered. In this case, the airflow suctioned from the annular recess 101 may form vortices, to increase rotational momentum of the overall vortices, and enhance a viscous force of the boundary layer on the annular boss 102, so as to prevent and restrain the vortices from shedding from two sides at the back (relative to the upwind incoming flow) of the annular boss 102, thereby achieving the object of suppressing the vortex-induced vibration, and actually disrupting the correlation of the airflow above and below the annular boss 102, and suppressing the vortex-induced vibration caused by the bypassing flow detachment.

In the above figures, the air guiding groove 102*a* is arc-shaped, and with the arc-shaped groove, for the upwind incoming flow flowing around the annular boss 102, a direction in which the arc-shaped groove protrudes is the same as that of the airflow to be guided by the arc-shaped groove, thus, a greater amount of airflow can be smoothly guided into the annular recess 101, and the airflow flows more smoothly. Moreover, the guided airflow may naturally form a vortex when flowing out from the air outlet at a radian, to increase the momentum of the vortex entering the corresponding annular recess 101, so as to prevent the bypassing flow detachment caused by the vortex shedding, thereby suppressing the vortex-induced vibration. As shown in FIG. 6, the air guiding grooves 102*a* at the left side guides the upwind incoming flow flowing from left to right, thus the arc shape protrudes rightward; the air guiding grooves 102*a* at the right side guides (not by the air suction function) the upwind incoming flow flowing from right to left, thus the arc shape protrudes leftward, therefore, the air guiding grooves are in the shape of a retracted rhombus. However, for achieving the smooth flowing of the airflow and increasing the momentum of the vortex, the shape of the air guiding groove 102*a* is not limited to the arc shape, it may also be, for example, other smooth curved shapes, and of course may also be configured in a straight line shape.

In the above embodiment, the depth of the air guiding groove 102*a* may be equal to the depth of the annular recess 101, and may also be set within 2 mm to 5 mm for example. The equal depth, on the one hand, facilitates the air guiding groove 102*a* smoothly guiding the airflow into the annular recess 101, on the other hand, facilitates the airflow in the annular recess 101 blowing out through the air guiding groove 102*a* smoothly. Of course, a depth difference may also be presented between the air guiding groove 102*a* and the annular recess 101.

Figure 11:
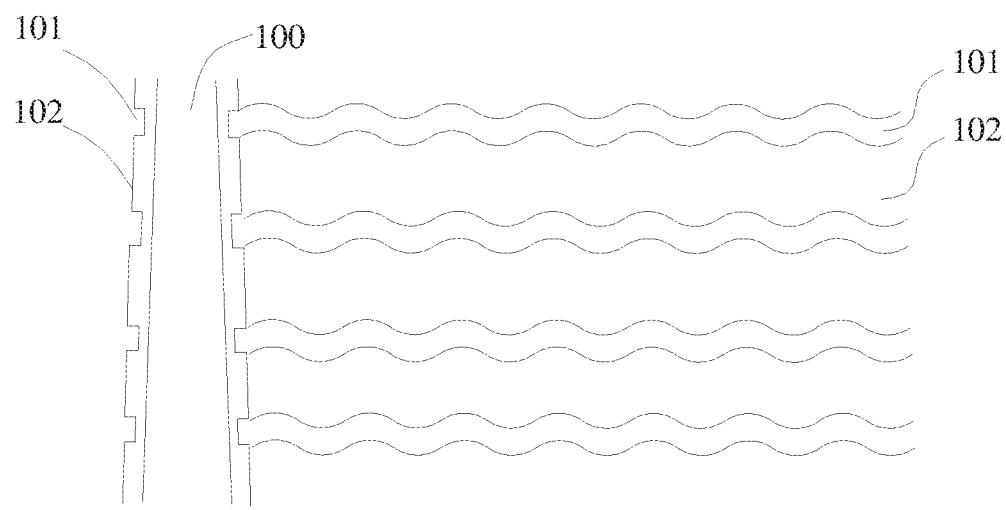
FIG. 11 is a schematic structural view showing that the annular recesses in the outer surface of the tower are arranged to be wave-shaped.

With reference to FIG. 11, FIG. 11 is a schematic structural view showing that the annular recesses 101 in the outer surface of the tower 100 are arranged to be wave-shaped. For simplification, the air guiding grooves 102*a* are not shown.

In the above embodiments, the annular recess 101 may be configured to be wave-shaped in the circumferential direction of the tower 100. The interfacial structure of the wave-shaped configuration can drive and induce fluid vibrations in the annular recess 101. This basic vibration induces a higher level of harmonic vibration in the boundary layer in the annular recess 101, which can excite the fluid flow to be transitioned in advance from the laminar flow to the turbulent flow, to have a higher momentum, so as to suppress the occurrence of the backflow phenomenon of the bypassing flow detachment under the adverse pressure gradient, thereby restraining or preventing the boundary layer from being detached from the outer surface of the tower 100, and suppressing the vortex-induced vibration.

Figure 12:
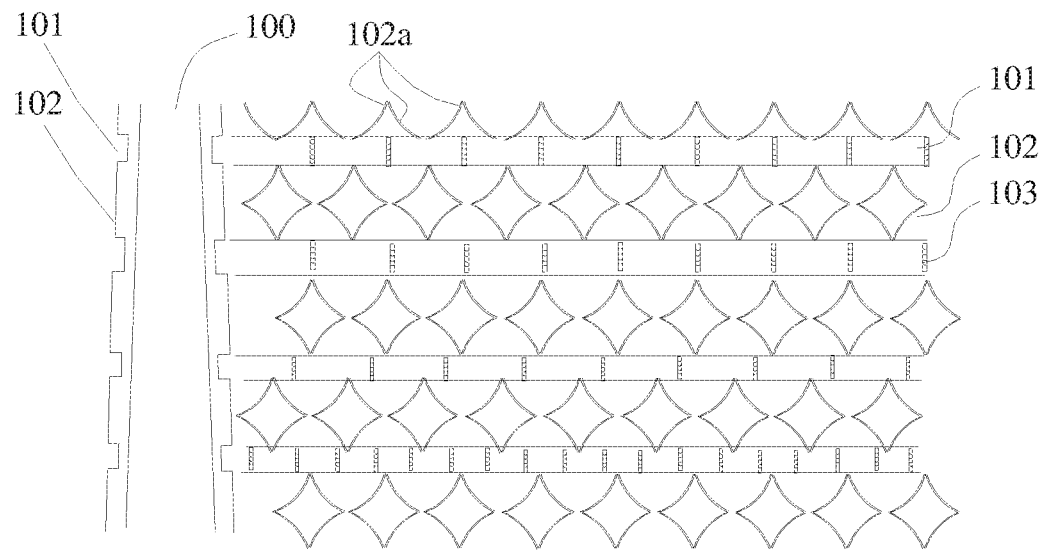
FIG. 12 is a schematic structural view showing that flow hindering protrusions are provided in annular recesses.

With continued reference to FIG. 12, FIG. 12 is a schematic structural view showing that flow hindering protrusions 103 are provided in the annular recesses 101.

In the above embodiments, a bottom of the annular recess 101 may be provided with multiple flow hindering protrusions 103 distributed in the circumferential direction of the tower 100. When the upwind incoming flow flows around the annular recess 101 and the airflow guided through the air guiding grooves 102*a* enters the annular recess 101, the flow hindering protrusions 103 can excite the airflow to form a radial surface fluctuation (which is perpendicular to the fluctuating direction of the aforementioned wave shape) along the tower 100, and the fluctuation is excited periodically. In the same way as the above analysis, the fluctuating force herein can also cause the boundary layer to transition in advance, that is, cause the boundary layer to transition in advance to form the turbulent flow, thereby suppressing the vortex-induced vibration.

Figure 13:
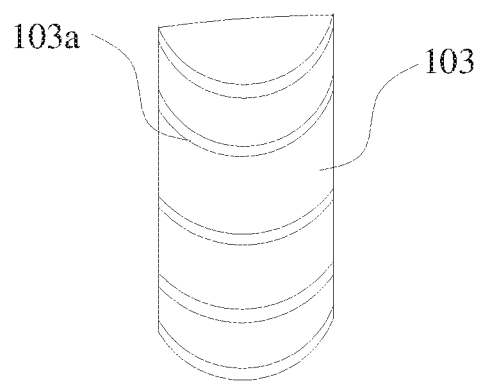
FIG. 13 is a schematic view showing the structure of the flow hindering protrusion in FIG. 12.

Further, the cross section of the flow hindering protrusion 103 is semicircular-shaped, as shown in FIG. 13, which is a schematic view showing the structure of the flow hindering protrusion 103 in FIG. 12.

An arc-shaped surface of the flow hindering protrusion 103 faces outward, which can reduce the resistance to the airflow when the airflow passes by, so as to ensure that the formed fluctuation has certain momentum. Furthermore, a plurality of transverse ribs 103*a* may also be provided on the outer surface of the flow hindering protrusion 103, to allow a protruding hindering string structure to be formed on the whole flow hindering protrusion 103, which is similar to a "speed bump" on the road. Thus, the friction of the outer surface of the flow hindering protrusion 103 is increased, and the adhesion to the boundary layer is increased, and the boundary layer is prevented from being driven by the overall upwind incoming flow, which is favorable for the formation of the radial fluctuation, and the effect is more obvious under the working condition with a high wind speed.

As a preferred solution, as shown in FIG. 12, in the height direction of the tower 100, the number of the flow hindering protrusions 103 distributed in the circumferential direction of the tower 100 gradually increases from top to bottom. Because from top to bottom, the perimeter of the tower 100 generally becomes greater, and in order to ensure the required fluctuation frequency, the lower it goes down, the more the flow hindering protrusions 103 are distributed.

In the above embodiment, there are various ways to form the annular bosses 102 and the annular recesses 101. For example, adhesive tapes (for example, an urethane tape) may be adhered to the outer surface of the tower 100 to form the annular bosses 102, and thus the annular recesses 101 may just be formed between the tapes. This method is simple in operation and low in cost, and the tapes are easy to replace.

The enclosure such as the tower 100 are generally required to be formed with an anti-corrosion coating on the outer surface, the anti-corrosion coating may also be formed through a vacuum impregnation technique, and the annular recesses 101 and the air guiding grooves 102*a* may be formed with the formation of the anticorrosive coating during the vacuum impregnation. This method is easy to be implemented in technology, and the formed structure is integrated with the anti-corrosion coating, thus is more reliable.

In addition to forming the annular recesses 101 and the annular bosses 102 by the above-mentioned methods of tape adherence and vacuum impregnation, the annular recesses 101 and the annular bosses 102 may also be formed by directly cutting on the outer surface of the enclosure such as the tower 100. Of course, in order to avoid stress concentration that may be caused by the cutting, a plastic layer may be sleeved on the outer surface of the enclosure, and then the annular recesses 101 are formed by cutting on the plastic layer, thus the annular bosses 102 are formed correspondingly.

Figure 14:
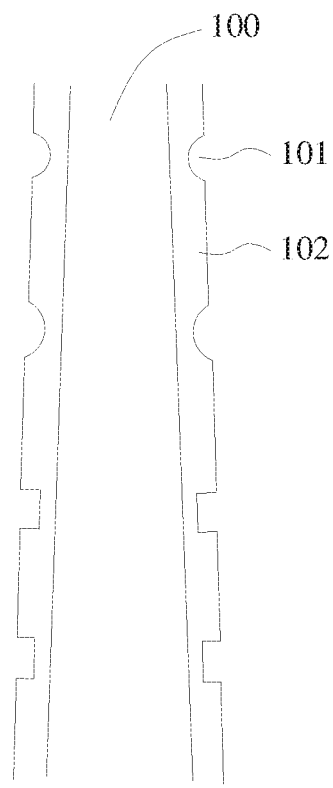
FIG. 14 is a schematic view showing different structures of the annular recesses in the outer surface of the tower.

Reference is made to FIG. 14, FIG. 14 is a schematic view showing different structures of the annular recesses 101 in the outer surface of the tower 100. In order to facilitate understanding, the annular recesses 101 with different cross-sectional shapes are all shown in the same drawing, and in practical processing, the annular recesses 101 with the same cross-sectional shape may be formed. Of course, the annular recesses 101 with different cross-sectional shapes may also be provided on the outer surface of the same tower 100. As shown in FIG. 14, the cross section of the annular recess 101 may be arc-shaped as shown at the upper part, and may also be U-shaped as shown at the lower part, or may be of other shapes of a curve or a trapezoid. The arrangement of an arc-shaped cross section of the annular recess is more beneficial for the rearward flowing of the airflow, thereby suppressing the vortex-induced vibration.

Figure 15:
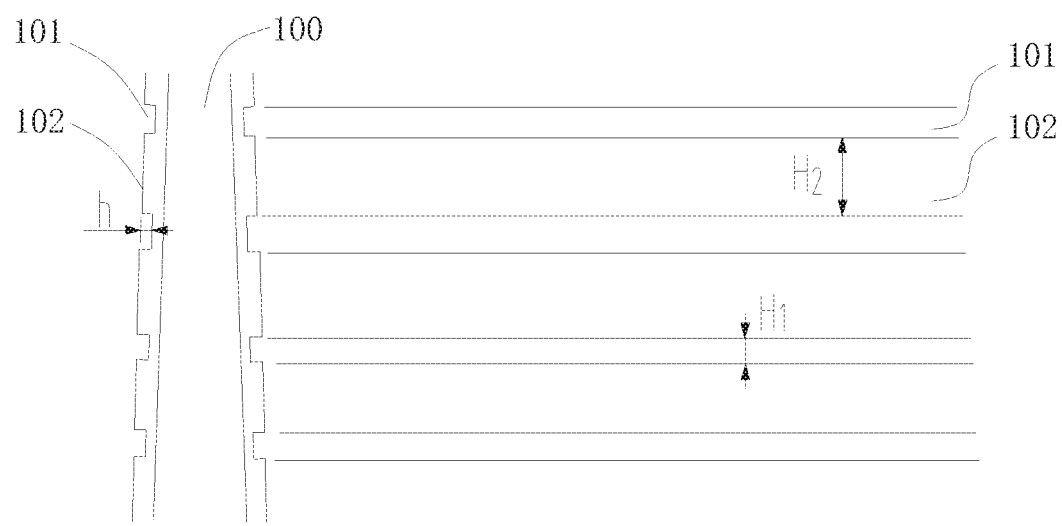
FIG. 15 is a schematic view showing the comparison between a width of the annular recess and a height of the annular boss on the outer surface of the tower.

In addition, reference is made to FIG. 15. FIG. 15 is a schematic view showing the comparison between a width of the annular recess 101 and a width of the annular boss 102 on the outer surface of the tower 100.

In the above embodiment, the widths of the annular boss 102 and the annular recess 101 may preferably be set according to the following condition:

$$H_1 \geq \frac{1}{10} H_2,$$

where, $H_1$ is the width of the annular recess 101, and $H_2$ is the width of the annular boss 102. Herein, the definition of the widths are conventionally understood, and is actually the dimensions of the annular recess 101 and the annular boss 102 in the height direction of the tower 100. The width of the annular recess 101 is less than the width of the annular boss 102, and is preferably greater than one tenth of the width of the annular boss 102. Because the annular recess 101 is required to have a certain width, to meet the requirement for the convergence of the airflow in the air guiding grooves 102a, so as to avoid congestion of the airflow due to an excessive narrow annular recess, and also avoid a relatively large through-flow cross sectional area due to an excessive wide annular recess, the above dimension design may ensure the function of the accelerated airflow.

In addition, the depths of the annular recesses 101 may gradually increase from bottom to top. As the depth of the annular recess 101 becomes greater, the damage to the boundary layer is more obvious, and the capability for vibration suppression is stronger. As described above, the disruption to the vibration of the tower 100 gradually increases from bottom to top. Therefore, the depths of the annular recesses 101 increasing from bottom to top can meet the requirement for vortex-induced vibration suppression. Similarly, the widths of the annular recesses 101 may also gradually increase from bottom to top.

It should be noted that, in the above embodiment, the enclosure is illustrated by taking the tower 100 as an example. It should be understood that the enclosure according to the present application is not limited to the tower 100, and may also be other structures having the similar configuration and having the requirement for vortex-induced vibration suppression, such as a television tower.

In order to better understand the vibration state of the enclosure and grasp the situation of the vibration suppression after the above convex-concave outer surface and the air guiding grooves 102a are provided, an inner wall of the enclosure according to any one of the above embodiments may be provided with a vibration monitoring device 104.

Figure 16:
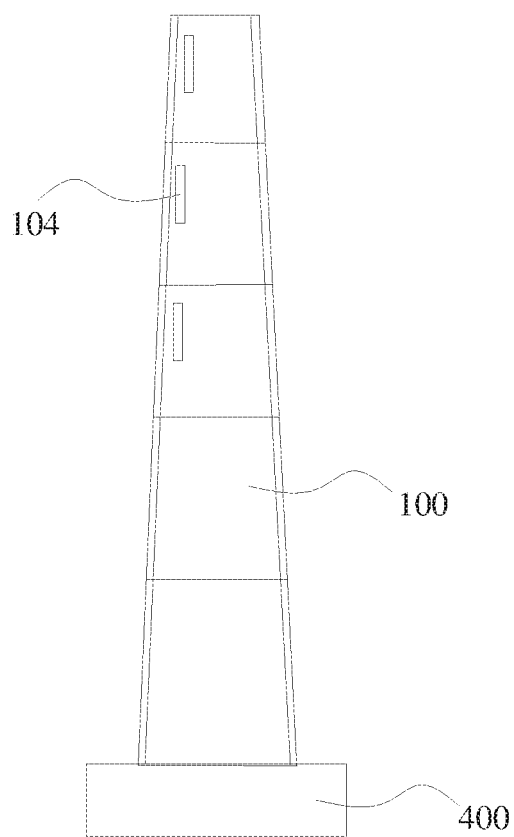
FIG. 16 is a schematic view of a tower having an inner wall being provided with a vibration monitoring device.

Reference is made to FIG. 16, FIG. 16 is a schematic view of a tower 100 having an inner wall being provided with a vibration monitoring device 104.

In the case that the vibration monitoring device 104 is provided, and a wireless receiving device may be provided on the ground, the operator can grasp the vibration state of the tower 100 on the ground, which facilitates the smooth hoisting in the case that the wind turbine is installed at a high altitude position, a top of a mountain or a mountainside.

The above embodiments are only preferred embodiments of the present application, and it should be noted that for those skilled in the art, several improvements and modifications can be made without departing from the principle of the present application, and these improvements and modifications should also be deemed to fall into the scope of protection of the present application.

The invention claimed is:

1. An enclosure having an outer surface with a vortex-induced vibration suppression function, wherein:
    the outer surface of the enclosure is provided with a plurality of annular recesses surrounding the enclosure, at least a portion of the outer surface between two adjacent annular recesses forming an annular boss with respect to the two adjacent annular recesses;
    an outer surface of the annular boss is provided with a plurality of air guiding grooves distributed in a circumferential direction of the annular boss; and
    the plurality of air guiding grooves are inclined upward or downward to guide at least part of an incoming flow of wind flowing to the annular boss into at least one of the two adjacent annular recesses.

2. The enclosure having the outer surface with the vortex-induced vibration suppression function according to claim 1, wherein the plurality of air guiding grooves are inclined upward and downward to guide at least part of the incoming flow of wind to the annular boss into both of the two adjacent annular recesses.

3. The enclosure having the outer surface with the vortex-induced vibration suppression function according to claim 2, wherein the plurality of air guiding grooves are provided in first and second rows, and air guiding grooves in each of the first and second rows are arranged to be inclined upward and inclined downward alternately in sequence.

4. The enclosure having the outer surface with the vortex-induced vibration suppression function according to claim 3, wherein positions of the air guiding grooves in the first and second rows are in one-to-one correspondence, and directions of inclination of corresponding air guiding grooves in the first and second rows are opposite.

5. The enclosure having the outer surface with the vortex-induced vibration suppression function according to claim 3, wherein the plurality of air guiding grooves are in an arc-shape or an curved shape.

6. The enclosure having the outer surface with the vortex-induced vibration suppression function according to claim 2, wherein at least one of the two adjacent annular recesses is arranged in a wave shape in a circumferential direction of the enclosure.

7. The enclosure having the outer surface with the vortex-induced vibration suppression function according to claim 2, wherein a bottom of at least one of the two adjacent annular recesses is provided with flow hindering protrusions distributed in a circumferential direction of the enclosure.

8. The enclosure having the outer surface with the vortex-induced vibration suppression function according to claim 2, wherein:
the annular boss is formed by adhering adhesive tapes to the outer surface of the enclosure; or
an anti-corrosion coating is formed on the outer surface of the enclosure by a vacuum impregnation process, and the anti-corrosion coating forms at least one of the two adjacent annular recesses and the plurality of air guiding grooves during the vacuum impregnation process.

9. The enclosure having the outer surface with the vortex-induced vibration suppression function according to claim 2, wherein from one end to another end of the enclosure, depths of annular recesses gradually increase or widths of the annular recesses gradually increase.

10. The enclosure having the outer surface with the vortex-induced vibration suppression function according to claim 1, wherein:
the annular boss is a first annular boss, and the enclosure comprises a second annular boss having a plurality of air guiding grooves inclined upward or downward, wherein the first and second annular bosses sandwich one of the two adjacent annular recesses; and
positions of air guiding grooves on the first and second annular bosses for guiding the incoming flow of wind into a same annular recess sandwiched by the first and second annular bosses are in one-to-one correspondence or staggered with respect to each other.

11. The enclosure having the outer surface with the vortex-induced vibration suppression function according to claim 1, wherein a depth of each of the plurality of air guiding grooves is equal to a depth of at least one of the two adjacent annular recesses.

12. The enclosure having the outer surface with the vortex-induced vibration suppression function according to claim 1, wherein at least one of the two adjacent annular recesses is arranged in a wave shape in a circumferential direction of the enclosure.

13. The enclosure having the outer surface with the vortex-induced vibration suppression function according to claim 1, wherein a bottom of at least one of the two adjacent annular recesses is provided with flow hindering protrusions distributed in a circumferential direction of the enclosure.

14. The enclosure having the outer surface with the vortex-induced vibration suppression function according to claim 13, wherein at least one of the flow hindering protrusions has one lateral surface attached to the bottom of the at least one of the two adjacent annular recesses and another lateral surface in an arc-shape, an outer surface of the at least one of the flow hindering protrusions being provided with a plurality of transverse ribs.

15. The enclosure having the outer surface with the vortex-induced vibration suppression function according to claim 1, wherein:
the annular boss is formed by adhering adhesive tapes to the outer surface of the enclosure; or
an anti-corrosion coating is formed on the outer surface of the enclosure by a vacuum impregnation process, and the anti-corrosion coating forms at least one of the two adjacent annular recesses and the plurality of air guiding grooves during the vacuum impregnation process.

16. The enclosure having the outer surface with the vortex-induced vibration suppression function according to claim 1, wherein:
a depth of at least one of the two adjacent annular recesses and a depth of each of the plurality of air guiding grooves both range from 2 mm to 5 mm; and
a width of the annular boss is greater than a width of each of the two adjacent annular recesses but is equal to or less than ten times of the width of each of the two adjacent annular recesses.

17. The enclosure having the outer surface with the vortex-induced vibration suppression function according to claim 1, wherein from one end to another end of the enclosure, depths of annular recesses gradually increase or widths of the annular recesses gradually increase.

18. The enclosure having the outer surface with the vortex-induced vibration suppression function according to claim 1, wherein the enclosure is a tower of a wind turbine or a tower of a television broadcasting device.

19. The enclosure having the outer surface with the vortex-induced vibration suppression function according to claim 18, wherein the enclosure is a tower of a wind turbine and the two adjacent annular recesses and the annular boss are arranged in a segment located at an upper part of the tower, the segment being longer than a length of a blade of the wind turbine.

20. The enclosure having the outer surface with the vortex-induced vibration suppression function according to claim 1, wherein an inner wall of the enclosure is provided with a vibration monitoring device.

* * * * *